United States Patent [19]

Lee et al.

[11] Patent Number: 5,414,790
[45] Date of Patent: May 9, 1995

[54] ACTUATION TOOL AND CAP FOR FIBER OPTIC CONNECTOR

[75] Inventors: Nicholas A. Lee, Woodbury; Michael A. Meis, Maplewood; Theodore J. Stone, Minneapolis, all of Minn.

[73] Assignee: Minnesota Mining and Manufacturing Company, St. Paul, Minn.

[21] Appl. No.: 149,641

[22] Filed: Nov. 9, 1993

[51] Int. Cl.⁶ ............................................. G02B 6/36
[52] U.S. Cl. ............................... 385/139; 385/134
[58] Field of Search ................... 385/53, 55, 56, 58, 385/60, 76, 77, 78, 139, 134

[56] References Cited

U.S. PATENT DOCUMENTS

| | | | |
|---|---|---|---|
| 4,865,412 | 9/1989 | Patterson | 385/71 |
| 4,979,792 | 12/1990 | Weber et al. | 385/53 |
| 4,986,626 | 1/1991 | Bossard | 385/76 |
| 5,040,867 | 8/1991 | de Jong et al. | 385/60 |
| 5,044,721 | 9/1991 | Nakamura | 385/53 |
| 5,080,460 | 1/1992 | Erdman et al. | 385/81 |
| 5,088,804 | 2/1992 | Grinderslev | 385/81 |
| 5,102,211 | 4/1992 | Slanley et al. | 385/81 |
| 5,113,474 | 5/1992 | Slanley et al. | 385/136 |
| 5,131,063 | 7/1992 | Monroe et al. | 385/78 |
| 5,140,662 | 8/1992 | Kumar | 385/87 |
| 5,142,598 | 8/1992 | Tabone | 385/78 |
| 5,146,525 | 9/1992 | Tabone | 385/78 |
| 5,208,887 | 5/1993 | Grinderslev | 385/81 |
| 5,216,734 | 6/1993 | Grinderslev | 385/60 |
| 5,241,613 | 8/1993 | Li et al. | 385/78 |

FOREIGN PATENT DOCUMENTS 486189  5/1992  European Pat. Off. ........ G02B 6/38

*Primary Examiner*—Frank Gonzalez
*Attorney, Agent, or Firm*—Gary L. Griswold; Walter N. Kirn; Jack V. Musgrove

[57] ABSTRACT

A combination dust cap and actuation tool for an optical fiber connector having a ferrule and an actuation mechanism for securing a fiber in the connector. The cap/tool has a body with a cylindrical extension having a cavity therein for receiving the ferrule, and a cantilever arm formed on the body, extending parallel with the extension. The cantilever arm has a boss at its distal end for forcibly contacting the actuation mechanism of the connector as the arm is moved in a direction perpendicular to the fiber axis. In this manner, the fiber may be secured to the connector without disturbing the position of the fiber. The cavity has a bottom surface which may have a depression centrally located therein, so that a fiber may be secured in the connector with the terminal end of the fiber extending a known length beyond the ferrule.

22 Claims, 4 Drawing Sheets

ACTUATION TOOL AND CAP FOR FIBER OPTIC CONNECTOR

BACKGROUND OF THE INVENTION

1. Field of the Invention

The present invention generally relates to devices for interconnecting optical fibers, and more particularly to a combination dust cap and actuation tool for an adhesiveless fiber optic connector.

2. Description of the Prior Art

Optical fibers have now surpassed copper wire as the preferred medium for telecommunications. As with copper wire, it often becomes necessary to interconnect optical fibers, for example, during installation or repair. The present invention is directed to a tool used to secure an optical fiber to a fiber optic connector, in order to complete and install such interconnections. In this regard, a fiber optic "connector" often refers to a device which allows repeatable engagement and disengagement of the cable, while a "splice" typically refers to a device which is used for the permanent attachment of two cable ends. These terms should not, however, be construed in a limiting sense as used herein since the present invention is applicable to the installation of all classes of fiber optic interconnection devices.

The prior art includes ferrule-type fiber optic connectors having a cylindrical member (the ferrule) usually made of a ceramic material, zirconia, or alumina, with a central bore for receiving the fiber. The ferrule is held by a collar which in turn may be surrounded by one of many different coupling shells. For example, a coupling shell having a bayonet-style latching mechanism is commonly referred to as an "ST" connector. An alternative shell having ramped surfaces which latch onto lever arms of a receptacle is known as an "SC" connector. Yet another shell having a simple threaded nut is known as an "FC" connector. There are many conventional techniques for securing an optical fiber in ferrule connectors. One of the most common is the use of a crimp tube which clamps the fiber optic cable reinforcing members (i.e., KEVLAR strands) to a backbone attached to the ferrule collar. See, e.g., U.S. Pat. No. 5,140,662. This technique requires the use of a plier-like crimping tool to compress the crimp tube about the backbone.

In another technique, illustrated in U.S. Pat. Nos. 5,088,804 and 5,102,211, an adhesiveless optical fiber termination is assembled by driving two telescoping workpieces together, compressing an elastomeric system seated within one of the workpieces to secure the optical fiber therein. This technique uses a different, rather complicated, tool having two primary elements which hold the workpieces and move toward one another for actuation. See also U.S. Pat. Nos. 5,080,460 and 5,131,063.

In U.S. Pat. No. 5,040,867, the fiber itself is secured in a clamping member within the ferrule collar, and the cable reinforcing strands are additionally secured by a crimping sleeve onto a backbone. In that design, a locking member slides over the ferrule collar and clamping member to secure the fiber. The locking member is actuated by another hand-held tool which moves the locking member along the axial direction of the fiber into the rear end of the connector. A separate dust cap is used to secure the forward end of the connector in the tool without damaging the ferrule.

One problem not addressed by these techniques is the proper positioning of the terminal end of the fiber, for example, to coincide with the end face of the ferrule. The foregoing techniques not only fail to take this problem into consideration, but they further make proper positioning difficult since the tools used to activate these connectors are designed to apply an axial force, i.e., parallel with the fiber axis, which tends to cause the fiber itself to move relative to the connector during the clamping process. Thus, precise registration of the fiber relative to the ferrule is impossible. Insertion of the connector into the assembly tool also adds a level of difficulty to the installation process. It would, therefore, be desirable to devise a tool which activates the clamping member of a fiber optic connector without disturbing the position of the fiber. It would further be advantageous to devise such a tool which precisely controls the position of the terminal end of the fiber with respect to the ferrule. It would also be desirable to incorporate such a tool into a dust cap for the connector to simplify installation of the fiber.

SUMMARY OF THE INVENTION

The present invention provides an actuation tool for an optical connector generally comprising a tool body having a cavity therein for removably receiving the forward end of the connector, and means for actuating the clamping member of the connector by exerting a force generally perpendicular to the fiber axis, rather than parallel thereto. In the preferred embodiment, the actuation means comprises a cantilever arm attached to the tool body, the arm having a boss at its distal end positioned with respect to the cavity in the tool body such that the boss is approximately adjacent to the clamping member of the connector when the forward end of the connector is inserted in the cavity.

The terminal end of the fiber may be precisely registered to coincide with the ferrule end face by providing a cavity which is designed to receive the connector such that the ferrule end face is mounted flush with the bottom surface of the cavity. Alternatively, the terminal end of the fiber may be precisely positioned slightly beyond the ferrule end face by providing a depression of known depth in the center of the bottom surface of the cavity, such that the fiber protrudes beyond the ferrule end face by a controlled length.

The tool is advantageously constructed in the form of a disposable dust cap so that it may be pre-installed from the factory, thereby eliminating the need to insert the connector into an assembly tool prior to fiber insertion, and providing the impression of an essentially tool-less connector. The combination dust cap/actuation tool may be modified for use with ST, SC, FC and even biconic-type connectors.

BRIEF DESCRIPTION OF THE DRAWINGS

The invention will best be understood by reference to the accompanying drawings, wherein.

DESCRIPTION OF THE PREFERRED EMBODIMENT

Figure 1:
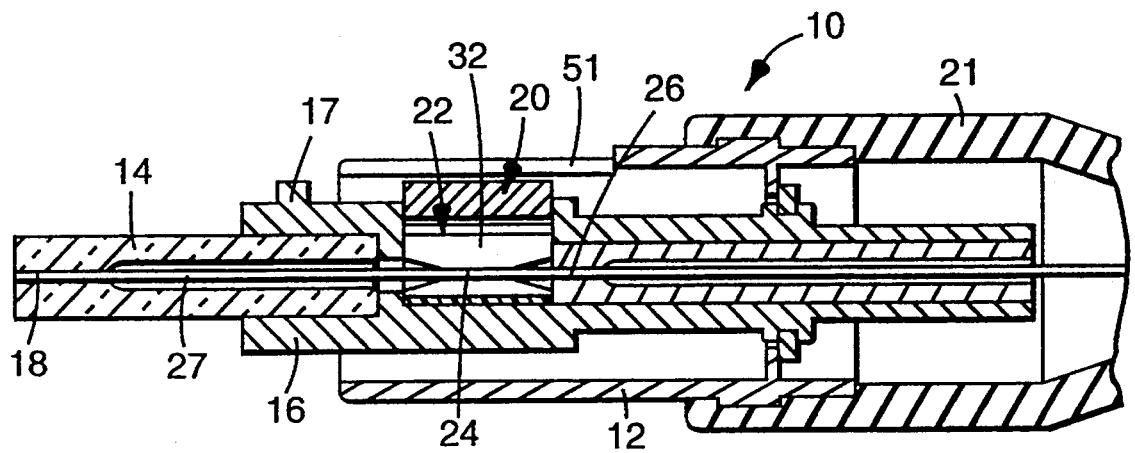
FIG. 1 is a longitudinal cross-section of a prior art fiber optic connector.
Figure 2:
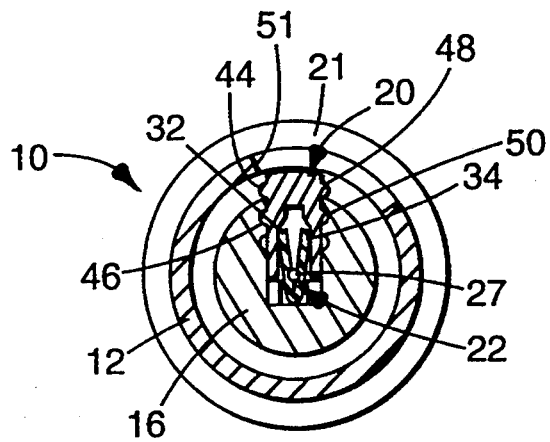
FIG. 2 is a transverse cross-section of the connector of FIG. 1, depicting the internal clamping element in its unactuated state.
Figure 3:
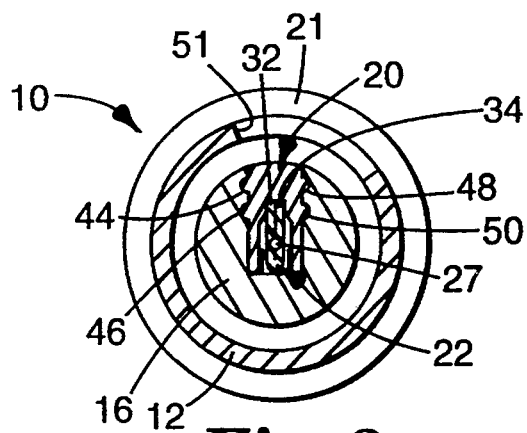
FIG. 3 is similar to the transverse cross-section of FIG. 2, but depicts the internal clamping element in its actuated state.
Figure 4:
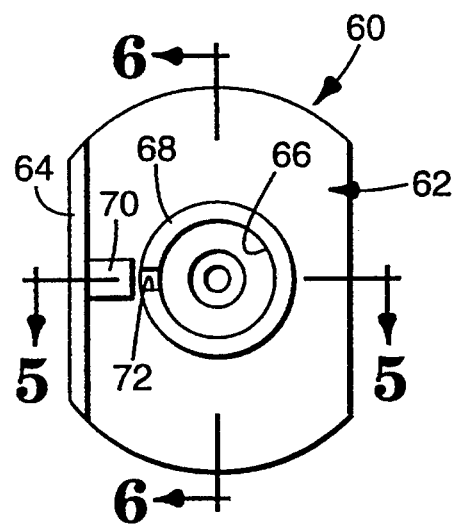
FIG. 4 is a top plan view of one embodiment of the actuation tool of the present invention.
Figure 5:
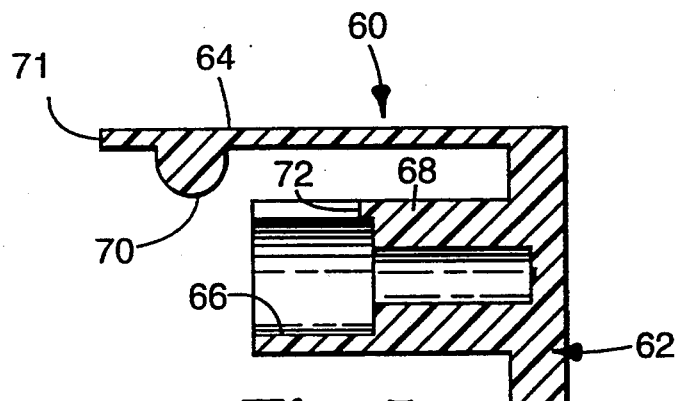
FIG. 5 is a sectional view of the tool of FIG. 4 taken along lines 5—5 thereof.
Figure 6:
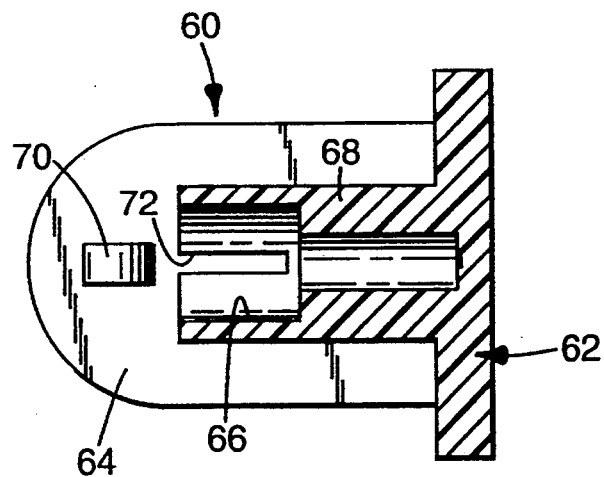
FIG. 6 is a sectional view of the tool of FIG. 4 taken along lines 6—6 thereof.

With reference now to the figures, and in particular with reference to FIGS. 1—3, there is depicted an adhesiveless, ferrule connector 10. Connector 10 is the subject of U.S. patent application Ser. No. 07/871,399 (now U.S. Pat. No. 5,337,390 issued on Aug. 9, 1994) and is described more fully in that application. Connector 10 is generally comprised of a tubular housing 12 and a ferrule 14 attached to housing 12 by means of a ferrule holder or collar 16. In the depicted embodiment, collar 16 has an alignment pin 17 which keys (mechanically polarizes) connector 10 to prevent rotation of ferrule 14 as the connector is inserted into a conventional receptacle (the receptacle is not shown). Ferrule 14 has a bore 18 therethrough for receiving the terminal portion of the optical fiber to be interconnected. Connector 10 includes many other conventional components, such as a strain relief boot 21, which are commonly used in prior art connectors.

Collar 16 also includes a plug or camming element 20 which engages a fiber gripping element 22. Fiber gripping element 22 has a groove 24 therein which is generally aligned with a bore 26 of collar 16, and with the bore 18 of ferrule 14. An optical fiber 27 enters the rear end of connector 10, passing through bore 26, fiber gripping element 22, and bore 18. The terminal end of the fiber is usually positioned to coincide with the end face of ferrule 14. Camming element 20 and fiber gripping element 22 are similar to the fiber optic splice disclosed in U.S. Pat. No. 4,865,412. As best seen in FIGS. 2 and 3, fiber gripping element 22 has two plates or legs 32 and 34 which share a common hinge. As camming element 20 is forced from its open, unactuated state (FIG. 2) to its closed, actuated state (FIG. 3), side bars of camming element 20 forcibly urge legs 32 and 34 toward one another, clamping fiber 27 therebetween. Thus, fiber 27 may be secured in connector 10 without the use of epoxy or other adhesives. Camming element 20 may have detentes or bumps 44, 46, 48 and 50 formed on the outer surface thereof which engage corresponding notches in collar 16 to secure camming element 20 in the open and closed states. An opening 51 is provided in housing 12 to allow access to camming element 20 so that it may be pushed down; actually, the depicted embodiment of connector 10 is an ST connector in which opening 51 is formed to receive a lug on the connector receptacle, thereby providing a bayonet-style latching mechanism.

With further reference to FIGS. 4–7, those figures illustrate one embodiment 60 of the novel actuation tool of the present invention. Tool 60 is designed for use with connector 10, and generally comprises a tool body 62 and an actuation arm 64 attached to body 62; arm 64 is preferably integrally formed with body 60. Accordingly, while tool 60 may be formed of any durable material, it is preferably constructed of a resilient polymer which is injection moldable, such as RADEL (a polyethersulfone) sold by Amoco. Body 62 has a cavity 66 therein for receiving the forward end of connector 10. Cavity 66 includes two portions of different inner diameters for respectively receiving collar 16 and ferrule 14. Tool 60 may take the form of a disposable dust cap which is pre-installed on connector 10 at the factory. Those skilled in the art will appreciate that pre-installation eliminates the need to insert the connector into an assembly tool prior to fiber insertion, thus simplifying the connector assembly, and providing the impression of an essentially tool-less connector. Of course, tool 60 also prevents contamination of the forward end of connector 10 during handling. In order to ensure that tool 60 remains on connector 10 during shipment, the (largest) inner diameter of cavity 66 is preferably approximately equal to the outer diameter of collar 16; similarly, the portion of body 62 having cavity 66 therein is preferably a cylindrical extension 68 whose outer diameter is approximately equal to the inner diameter of housing 12. In this manner, when connector 10 is inserted in tool 60 (FIG. 7), it is held snugly therein by a friction fit.

Figure 7:
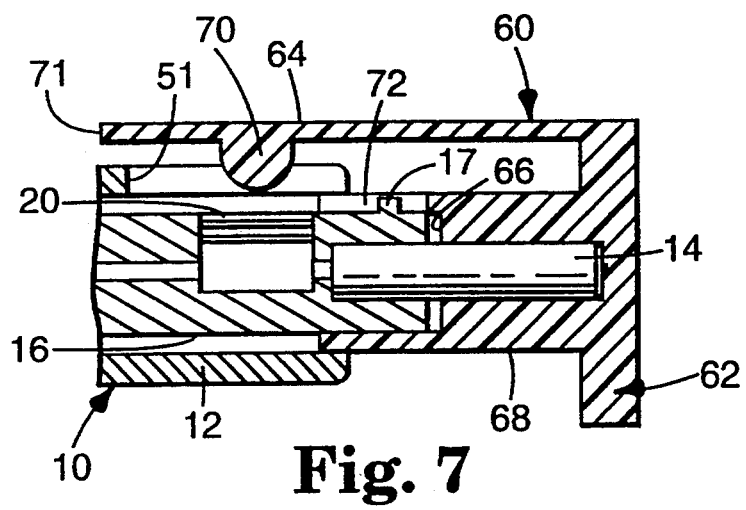
FIG. 7 is similar to the sectional view of FIG. 5, additionally depicting the insertion of an ST connector.

Turning now to FIG. 7, operation of the actuation tool 60 of the present invention is relatively straightforward. First, the forward end of connector 10 is inserted into cavity 66. As previously noted, this step may be performed at the factory. It may be seen from FIG. 7 that the smaller diameter portion of cavity 66 (which receives ferrule 14) need not have a length which is exactly equal to ferrule 14, i.e., the length of this portion of the cavity may be shorter than the length of ferrule 14 extending beyond collar 16. The next step is insertion of the fiber into connector 10, i.e., by threading it into bore 26 of collar 16. The fiber should be fully inserted until it abuts the bottom surface of cavity 66. As further explained below, care should be taken during this and the following step to ensure that connector 10 is fully inserted into tool 60, i.e., with the end face of ferrule 14 also abutting the bottom surface of cavity 66. When the connector is properly inserted, camming element 20 is generally located adjacent a button or boss 70 formed on actuation arm 64. In the embodiment 60 of the present invention which is designed for an ST connector, cylindrical extension 68 has a slot 72 therein for receiving keying pin 17. Keying the tool in this manner also conveniently aligns boss 70 over slot 51 and camming element 20.

When the fiber and connector are in proper position, fiber gripping element is actuated by depressing actuation arm 64, causing boss 70 to apply pressure against camming element 20, thereby squeezing together legs 32 and 34, and securing the fiber. The rounded surface of boss 70 facilitates actuation by providing a self-centering action if the boss is not positioned exactly adjacent the camming element. The distal end 71 of arm 64 preferably extends slightly beyond boss 70 to allow the user to apply greater leverage. The natural resilience of the cantilevered actuation arm 64 causes it to rebound away from camming element 20 when pressure is released. Connector 10 may then be removed from tool 60, and tool 60 discarded.

Figure 8:
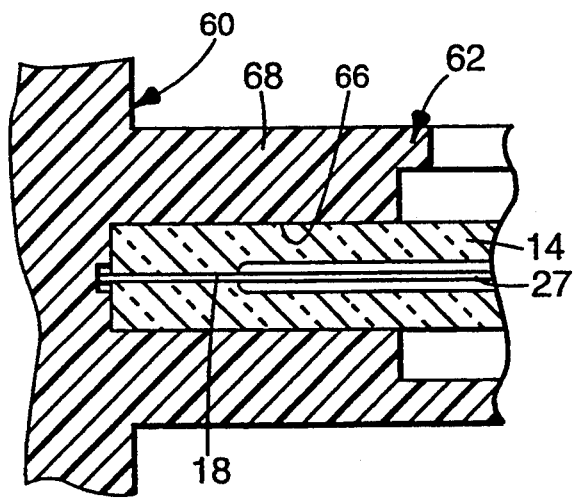
FIG. 8 is a detail view of FIG. 7 illustrating the precise positioning of the terminal end of the optical fiber with respect to the connector.

A unique advantage of tool 60 lies in its ability to control the position of an inserted fiber relative to ferrule 14, and to activate fiber gripping element 22 (thereby securing the fiber in place) without disturbing the position of the fiber relative to the ferrule. If the bottom surface of cavity 66 is smooth and flat, then the end face of ferrule 14 and the terminal end of the fiber are coplanar, i.e., they coincide. This flush positioning of the ferrule and fiber is very useful in "cleave and crimp" operations wherein the fiber is cleaved prior to insertion into the connector, and then the cable reinforcing fibers (typically KEVLAR strands) are crimped to the backbone of collar 16. Alternatively, as shown in FIG. 8, the bottom surface of cavity 66 may have a depression of a known depth, so that the fiber protrudes beyond ferrule 14 by a controlled amount. This is useful in "crimp and polish" operations wherein the fiber is attached to the connector and then the terminal end of the fiber is polished (along with the end face of the ferrule) against a lapping film. The depth of the depression in the bottom surface of cavity 66 is preferably about one fiber diameter.

In either case, those skilled in the art will appreciate that the fiber is not disturbed during actuation of the gripping element because the actuation force is applied generally perpendicular to fiber axis, rather than along the fiber axis. Tool 60 also facilitates handling of the connector during the crimp operation wherein the reinforcing fibers of the fiber optic cable are secured about the backbone.

Figure 12:
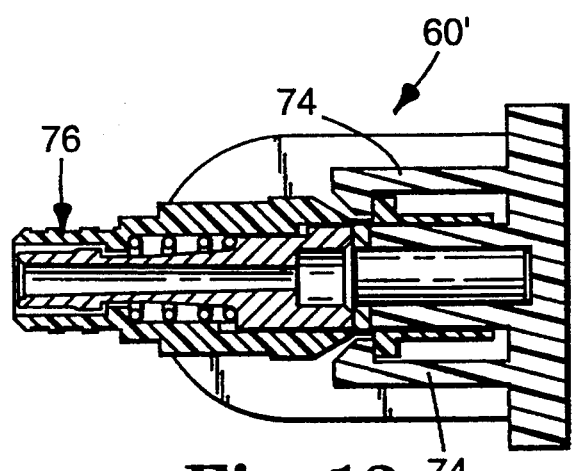
FIG. 12 is similar to the sectional view of FIG. 11, additionally depicting the insertion of an SC connector.
Figure 9:
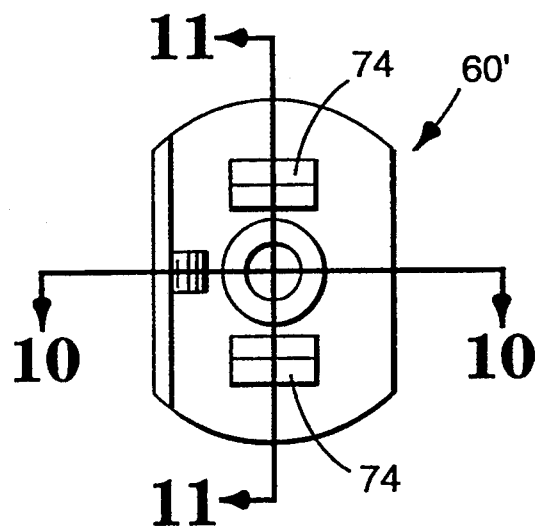
FIG. 9 is a top plan view of another embodiment of the actuation tool of the present invention.
Figure 10:
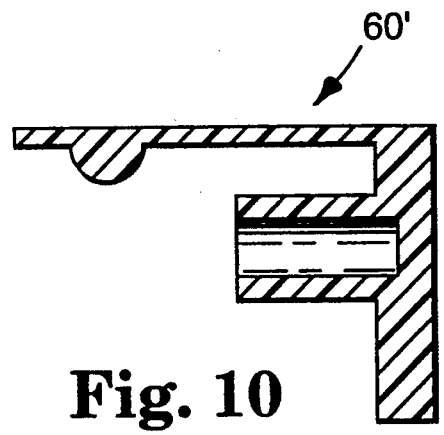
FIG. 10 is a sectional view of the tool of FIG. 9 taken along lines 10—10 thereof.
Figure 11:
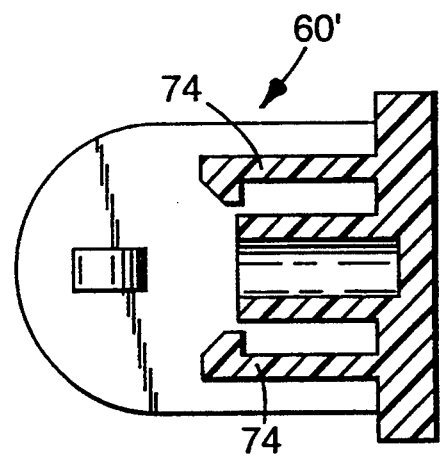
FIG. 11 is a sectional view of the tool of FIG. 9 taken along lines 11—11 thereof.

The present invention may be applied to other types of ferrule connectors besides ST connectors. For example, FIGS. 9–11 depict a slightly modified tool 60' which has been adapted for use with an SC connector. Tool 60' is essentially identical to tool 60 except for the manner in which the connector is held on the tool. Specifically, tool 60' has two latch arms 74 which engage the sides of a conventional SC connector which has been modified to include the fiber gripping element. The housing for such an SC connector 76 has a generally rectangular cross-section as shown in FIG. 12. In the embodiment 60' of the present invention, the cavity within the tool body has only a single diameter portion for receiving the ferrule. A tool having no latch arms (similar to tool 60) may be used with an SC connector; in such an embodiment (not shown), the extension of the tool body has an inner contour which matches the outer contour of the asymmetric inner sleeve used in a conventional SC connector, again providing a friction fit to snugly secure the connector. The present invention may also be used with a biconic, rather than ferrule, connector since the frusto-conical plug of a biconic connector is equivalent to a ferrule.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. Specifically, tool 60 may easily be modified for any connector in which the fiber is secured by movement of an element in a direction generally perpendicular to the fiber axis. It is therefore contemplated that such modifications can be made without departing from the spirit or scope of the present invention as defined in the appended claims.

We claim:

1. A device for securing an optical fiber in a connector having a fiber gripping actuation member, the device comprising:
   a body having a cavity therein for receiving a forward end of the connector; and
   means attached to said body for forcibly contacting the actuation member of the connector, said contacting means exerting a force which is generally perpendicular to an axis of a fiber retained in the connector.

2. The device of claim 1 wherein said contacting means includes an arm member attached to said body.

3. The device of claim 1 wherein:
   the connector has a generally cylindrical ferrule member at the forward end thereof; and
   said cavity has a generally cylindrical portion whose inner diameter is approximately equal to an outer diameter of the ferrule member.

4. The device of claim 1 wherein:
   the connector has a generally cylindrical ferrule member at the forward end thereof, and a generally tubular housing member surrounding the ferrule member;
   said cavity is formed in a generally cylindrical extension of said body, said extension having an outer diameter which is approximately equal to an inner diameter of the housing; and
   said cavity has a generally cylindrical portion whose inner diameter is approximately equal to an outer diameter of the ferrule member.

5. The device of claim 1 wherein said body includes latch means for releasably securing the forward end of the connector in said cavity.

6. The device of claim 1 wherein said body has a slot therein proximate said cavity for receiving a keying pin on the connector.

7. The device of claim 2 wherein:
   said arm member is a cantilever integrally formed with said body;
   said cantilever has a distal end; and
   said contacting means further includes a boss formed near said distal end of said cantilever.

8. The device of claim 2 wherein said body has a slot therein proximate said cavity for receiving a keying pin on the connector, said slot being generally aligned with said arm member.

9. The device of claim 3 wherein said body further includes registration means for precisely positioning a terminal end of an optical fiber with respect to an end face of the ferrule member.

10. The device of claim 7 wherein said boss has a generally rounded surface.

11. The device of claim 9 wherein said registration means comprises a depression formed in a bottom surface of said cavity, said depression being generally located at a center of said bottom surface.

12. A device for positioning an optical fiber in a connector having a ferrule member located at a forward end of the connector, an actuation element and a fiber gripping element which moves from an unactuated state to an actuated state upon movement of the actuation element, the device comprising:
   a body having a cavity therein for receiving the forward end of the connector;
   means for releasably securing the forward end of the connector in said cavity; and registration means formed in said body for precisely positioning a terminal end of an optical fiber with respect to the forward end of the connector, outside of the connector and proximate an end face of the ferrule member.

13. The device of claim 12 wherein:

the ferrule member is generally cylindrical; and said cavity has a generally cylindrical portion whose inner diameter is approximately equal to an outer diameter of the ferrule member.

14. The device of claim 12 further comprising arm means attached to said body for forcibly contacting the actuation element of the connector, said arm means being movable in a direction which is generally perpendicular to an axis of a fiber retained in the connector.

15. The device of claim 12 wherein:

the ferrule member is generally cylindrical, and the connector further has a collar member attached to the ferrule member, and a generally tubular housing member surrounding the ferrule member and collar member;

said collar member has an alignment pin formed thereon;

said cavity is formed in a generally cylindrical extension of said body, said extension having an outer diameter which is approximately equal to an inner diameter of the housing, and further having a slot therein for receiving the alignment pin; and said cavity has a generally cylindrical portion whose inner diameter is approximately equal to an outer diameter of the ferrule member.

16. The device of claim 12 wherein said securing means comprises a pair of latch arms attached to said body.

17. The device of claim 13 wherein said registration means comprises a depression formed in a bottom surface of said cavity, said depression being generally located at a center of said bottom surface.

18. A combined dust cap and actuation tool for an adhesiveless connector having a ferrule, the cap/tool comprising:

a body having a generally cylindrical extension, and having a cavity formed in said extension for receiving the ferrule;

a cantilever arm integrally formed with said body, said arm extending in a direction generally parallel with said extension, said arm having a distal end and a boss formed near said distal end;

means for releasably securing the ferrule in said cavity; and registration means for precisely positioning a terminal end of an optical fiber with respect to the ferrule.

19. The cap/tool of claim 18 wherein said securing means comprises a pair of latch arms attached to said body on opposite sides of said extension, and extending in a direction generally parallel with said extension.

20. The cap/tool of claim 18 wherein:

the ferrule is generally cylindrical;

the connector further has a generally cylindrical collar attached to the ferrule, and a generally tubular housing surrounding the ferrule and collar;

said collar has an alignment pin formed thereon;

said extension has an outer diameter which is approximately equal to an inner diameter of the housing, and further has a slot therein for receiving the alignment pin; and said cavity has a first generally cylindrical portion whose inner diameter is approximately equal to an outer diameter of the ferrule, and a second generally cylindrical portion whose inner diameter is approximately equal to an outer diameter of the collar.

21. A device for positioning an optical fiber in a connector having a generally cylindrical ferrule member at forward end thereof, a collar member attached to the ferrule member, a generally tubular housing member surrounding the ferrule member and collar member, an actuation element and a fiber gripping element which moves from an unactuated state to an actuated state upon movement of the actuation element, the device comprising:

a body having a cavity therein for receiving the forward end of the connector, said cavity being formed in a generally cylindrical extension of said body and having a generally cylindrical portion whose inner diameter is approximately equal to an outer diameter of the ferrule member, and said extension having an outer diameter which is approximately equal to an inner diameter of the connector housing, and further having a slot therein for receiving an alignment pin formed on the collar member of the connector;

means for releasably securing the forward end of the connector in said cavity; and registration means formed in said body for precisely positioning a terminal end of an optical fiber with respect to the forward end of the connector.

22. A device for positioning an optical fiber in a connector having an actuation element and a fiber gripping element which moves from an unactuated state to an actuated state upon movement of the actuation element, the device comprising:

a body having a cavity therein for receiving a forward end of the connector;

means for releasably securing the forward end of the connector in said cavity, including a pair of latch arms attached to said body; and registration means formed in said body for precisely positioning a terminal end of an optical fiber with respect to the forward end of the connector.

* * * * *